US007949441B2

(12) United States Patent
Baig et al.

(10) Patent No.: US 7,949,441 B2
(45) Date of Patent: May 24, 2011

(54) SYSTEM AND METHOD FOR SELECTIVELY LIMITING TRACTIVE EFFORT TO FACILITATE TRAIN CONTROL

(75) Inventors: Mirza Aref Ahmed Baig, Erie, PA (US); Richard L. Evans, North East, PA (US); Scott Sexauer, Erie, PA (US); Christopher E. Pallo, North East, PA (US); Ning Zhang, Melbourne, FL (US); Steven Andrew Kellner, Melbourne, FL (US); Leonard Hill, Erie, PA (US); Bruce M. Sweeley, Erie, PA (US); James Glen Corry, Palm Bay, FL (US)

(73) Assignee: General Electric Company, Schenectady, NY (US)

( * ) Notice: Subject to any disclaimer, the term of this patent is extended or adjusted under 35 U.S.C. 154(b) by 945 days.

(21) Appl. No.: 11/094,006

(22) Filed: Mar. 30, 2005

(65) Prior Publication Data

US 2005/0171658 A1 Aug. 4, 2005

Related U.S. Application Data

(63) Continuation of application No. 10/354,638, filed on Jan. 30, 2003, now Pat. No. 6,922,619.

(60) Provisional application No. 60/319,128, filed on Feb. 28, 2002.

(51) Int. Cl.
*G06F 19/00* (2006.01)

(52) U.S. Cl. .................. 701/20; 701/70; 303/7; 303/16; 303/20; 340/424

(58) Field of Classification Search .................... 701/20, 701/70, 36; 303/7, 16, 20; 246/187; 377/24, 377/26; 370/432; 340/424, 426, 172.5
See application file for complete search history.

(56) References Cited

U.S. PATENT DOCUMENTS

| | | | |
|---|---|---|---|
| 4,041,283 A | 8/1977 | Mosier | |
| 4,042,810 A * | 8/1977 | Mosher | 701/19 |
| 4,401,035 A | 8/1983 | Spigarelli et al. | |
| 5,950,967 A | 9/1999 | Montgomery | |
| 6,144,901 A * | 11/2000 | Nickles et al. | 701/19 |
| 6,332,106 B1 * | 12/2001 | Hawthorne et al. | 701/19 |
| 6,401,015 B1 * | 6/2002 | Stewart et al. | 701/19 |
| 6,680,918 B1 * | 1/2004 | Haley | 370/282 |

* cited by examiner

*Primary Examiner* — Ronnie Mancho
(74) *Attorney, Agent, or Firm* — Robert Wawrzyn, Esq.; Enrique J. Mora, Esq.; Beusse, Wolter, Sanks, Mora & Maire, P.A.

(57) ABSTRACT

Method for controlling the level of tractive efforts in a train having a first locomotive at a head end of the train, constituting a lead locomotive, and a second locomotive positioned in the train behind the lead locomotive, constituting a remote locomotive, with the remote locomotive being configured to selectively operate in either of two modes of operation, such as a first mode in which the locomotive operates at a full tractive effort level of operation and a second mode in which the locomotive operates in a partial tractive effort level of operation producing a tractive effort which is less than the full tractive effort of the locomotive. The method allows selecting (e.g., at the lead locomotive) one of the two modes of operation for producing a level of tractive effort appropriate for conditions as the train moves along a length of track. The method further allows transmitting a signal indicative of the selected mode of operation from the lead locomotive to the remote locomotive. The signal is received at the remote locomotive. The tractive effort generated at the remote locomotive is controlled so as not to exceed the selected level.

1 Claim, 3 Drawing Sheets

Tractive Effort versus Speed

SYSTEM AND METHOD FOR SELECTIVELY LIMITING TRACTIVE EFFORT TO FACILITATE TRAIN CONTROL

This application is a continuation of U.S. patent application Ser. No. 10/354,638 filed Jan. 30, 2003 now U.S. Pat. No. 6,922,619 which in turn claims the benefit of U.S. application Ser. No. 60/319,128 filed Feb. 28, 2002 and is each herein incorporated by reference in its entirety.

BACKGROUND OF THE INVENTION

The invention relates generally to locomotive propulsion systems and, in particular, to locomotive controllers for selectively limiting tractive effort in locomotives.

Compared to earlier locomotives, such as locomotives equipped with a DC (direct current) propulsion system, locomotives equipped with an AC (alternating current) propulsion system generally produce at low speeds substantially more tractive effort and provide higher adhesion to the rails. When the locomotive is used for heavy hauling application, such as the hauling of bulk materials, grain, etc., this high tractive effort is desirable. However, the high tractive effort provided by these high performance locomotives, as may be part of a remote consist of locomotives in a relatively light hauling application, could cause lifting or derailment of one or more cars under certain conditions, particularly in curvy terrain. Examples of factors that may adversely affect operation of the train may include the presence of one or more lighter cars, uneven tonnage distribution, the presence of one or more empty cars in the train, etc.

In view of the foregoing considerations, it would be desirable to provide system and techniques that would enable a controllable reduction in locomotive tractive effort. This would avoid operation in modes of high tractive effort to reduce the tendency of some of the railcars to lift from the rail tracks and hence avoid the possibility of derailment, such as could occur in the event the high tractive effort is not commensurate with the actual characteristics of the train load, such as magnitude of the load, uneven distribution of the load, etc. Thus, this invention in one aspect thereof, selectably reduces the maximum tractive effort generated by locomotives used in remote distributed power applications, while retaining their full horsepower at higher speeds where tractive effort is typically reduced. It would be further desirable to allow users of locomotive fleets to be able to quickly and reliably configure a locomotive capable of delivering high tractive effort for multiple applications, such as those where high tractive effort is required as well as for applications that otherwise would call for lower rated locomotives.

BRIEF SUMMARY OF THE INVENTION

Generally, the present invention fulfills the foregoing needs by providing in one aspect thereof, a method for controlling the level of tractive efforts in a train having a first locomotive at a head end of the train, constituting a lead locomotive, and a second locomotive positioned in the train behind the lead locomotive, constituting a remote locomotive, with the remote locomotive being configured to selectively operate in either of two modes of operation comprising a first mode in which the locomotive operates at a full tractive effort level of operation and a second mode in which the locomotive operates in a partial tractive effort level of operation producing a tractive effort which is less than the full tractive effort of the locomotive. The method allows selecting (e.g., at the lead locomotive) one of the two modes of operation for producing a level of tractive effort appropriate for conditions as the train moves along a length of track. The method further allows transmitting a signal indicative of the selected mode of operation from the lead locomotive to the remote locomotive. The signal is received at the remote locomotive. The tractive effort generated at the remote locomotive is controlled so as not to exceed the selected level a method for remotely controlling the level of tractive effort produced in at least one locomotive remote from a lead locomotive in a train.

In another aspect thereof, the present invention further fulfills the foregoing needs by providing a system for remotely controlling the level of tractive effort produced in at least one locomotive in a train. The system includes a tractive effort mode selector configured to remotely select one of the following operational modes for the at least one locomotive: a limited tractive effort mode and a full tractive effort mode. The system further includes a tractive effort processor configured, when selecting the limited tractive effort mode, to limit the value of tractive effort in the at least one locomotive to a lesser value of the full tractive effort normally supplied by said locomotive, wherein the lesser value of the full tractive effort is selected to avoid undesirable lifting conditions relative to a rail track where the train travels, the tractive effort processor further configured, when selecting the full tractive effort mode, to command the tractive effort in the at least one locomotive to the values of full tractive effort normally supplied by said locomotive.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
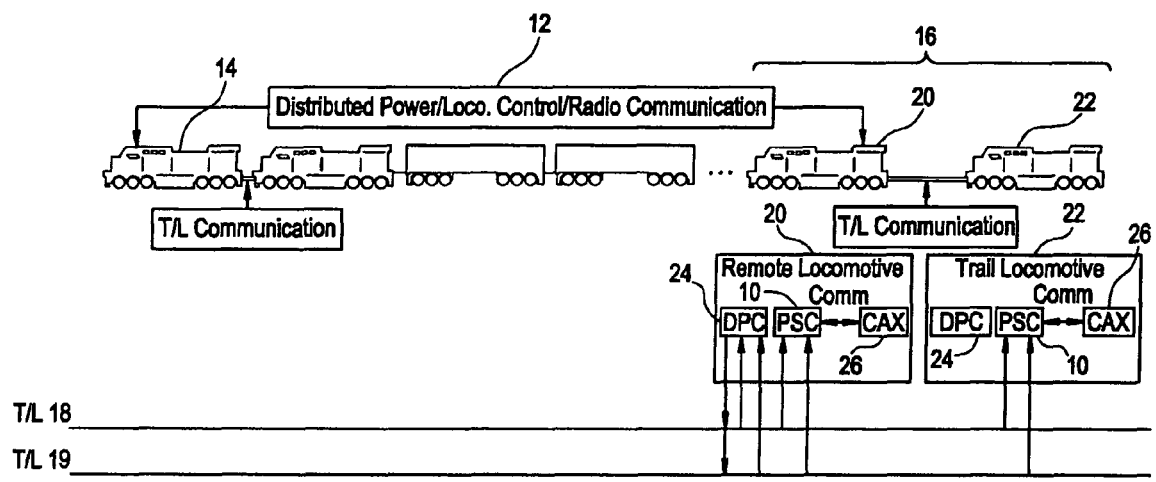
FIG. 1 illustrates in part a schematic representation of a train that may benefit from system and method embodying aspects of the present invention for selectably controlling the level of tractive effort produced by one or more locomotives remote from a lead locomotive, with the communications among the locomotives being wireless from consist to consist and being via trainline connections and/or wireless within a consist.
Figure 2:
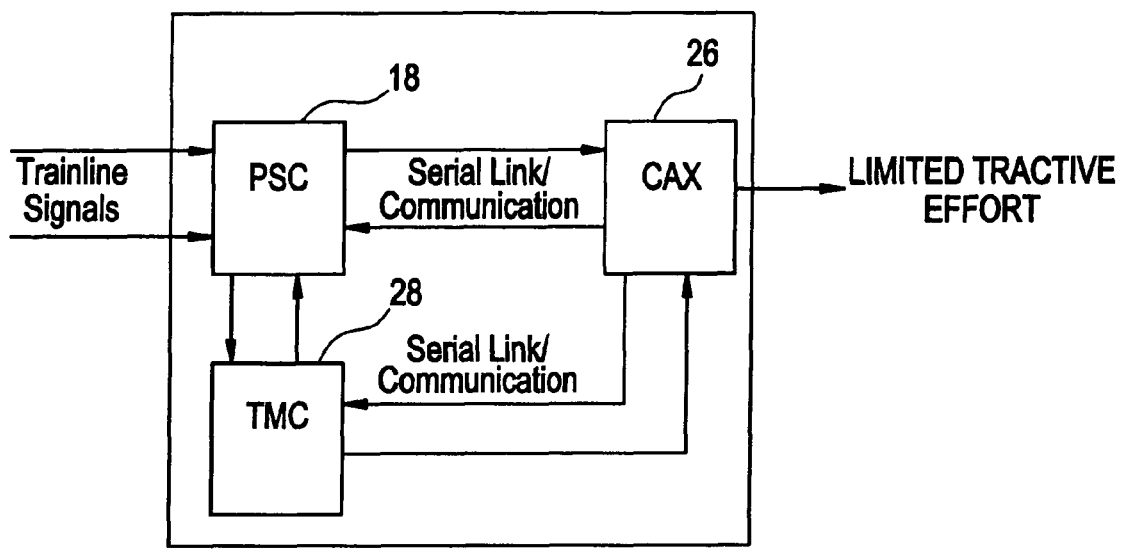
FIG. 2 is a block diagram of exemplary controllers that may be remotely actuated for providing selectable control of tractive effort produced in the locomotive.

In one exemplary embodiment, a propulsion system controller 10 (PSC) onboard each locomotive may be responsive to tractive-effort control signals generated in response to commands wirelessly communicated with locomotive communication equipment 12 (e.g., referred to in commerce as Locotrol® Distributed Power Communication Equipment) from a lead locomotive 14 relative to a remote consist 16. By way of example, consist 16 is shown to be made up of a remote locomotive 20 and a trail locomotive 22. It will be appreciated that the present invention is not limited to the consist arrangement shown in FIG. 1 since many other consist arrangements may be provided depending on the specific train application. As will be described below, respective controllers on-board each locomotive, such as distributed power controller (DPC) 24, primary locomotive controller 26 (CAX), the PSC controller and the communication equipment may be configured with appropriate control algorithms to selectively limit the tractive effort provided by each locomotive of a consist.

Figure 4:
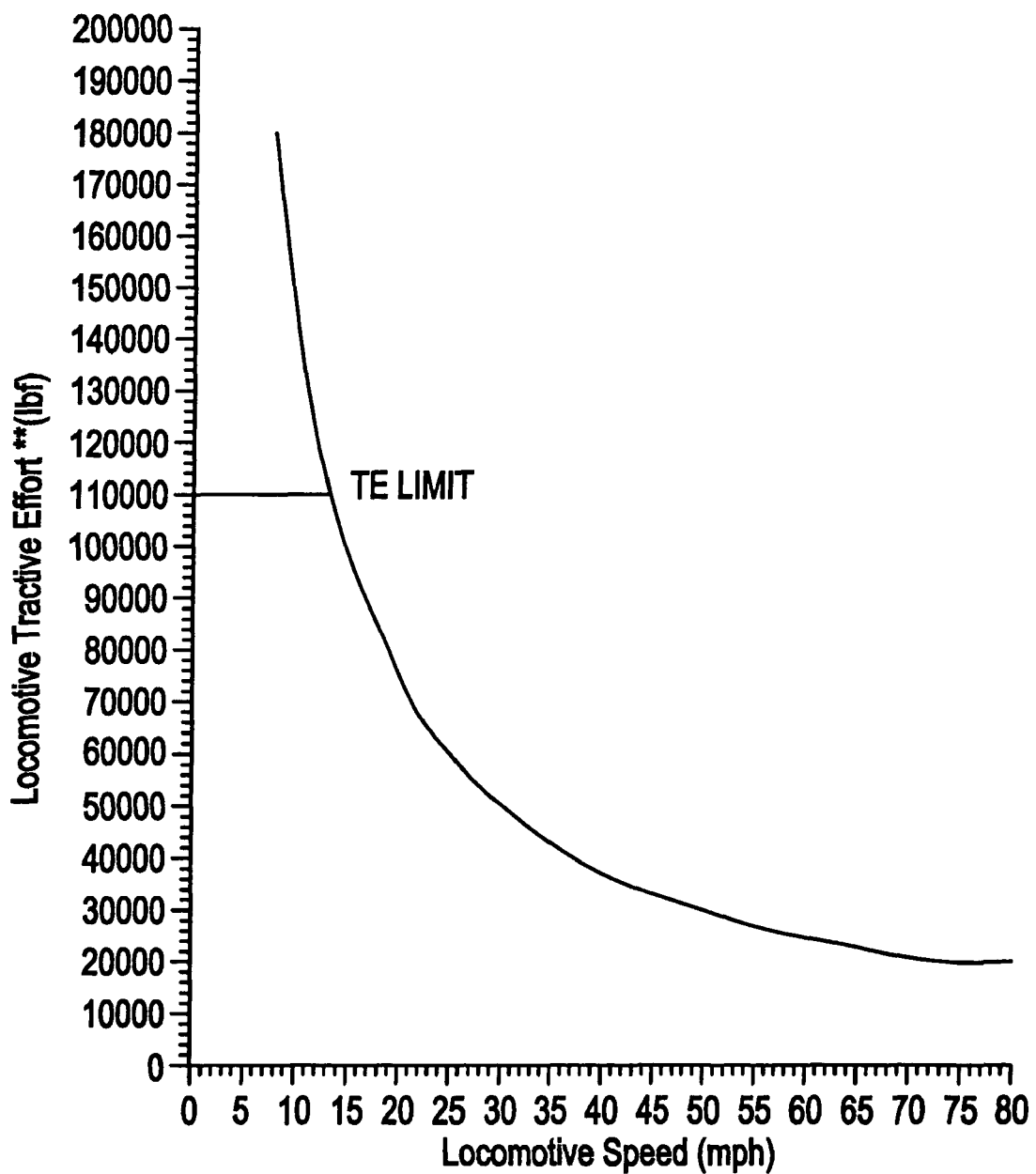
FIG. 4 is an exemplary plot of tractive effort as a function of locomotive speed including an exemplary tractive effort limit that may enable a given class of locomotives to be used both for heavy hauling applications as well as for applications that would traditionally call for a different class of locomotives with lesser ratings of tractive effort.

In one exemplary embodiment, whenever a pair of locomotive train lines (such as lines T/L 18 and T/L 19) is energized (High), each locomotive may be limited to a lesser value of the total tractive effort that such locomotive is designed to provide. As shown in FIG. 4, in an exemplary embodiment, the locomotive may be limited to approximately 110,000 pounds of tractive effort for all six wheel-axles instead of the normal 180,000 pounds of tractive effort. In the exemplary embodiment, the communication equipment may be configured by way of the DPC controller onboard the remote locomotive to energize the train lines to initiate the limited tractive effort (TE) mode of operation. In one exemplary embodiment, the PSC controller 10 would detect when both train lines are active and interpret this condition as a command for limited tractive effort operation. A reduced tractive effort command would then be imposed on the respective traction motor controllers (TMC) 28.

In order for a remote locomotive to reduce tractive effort, that locomotive would initially determine whether it is equipped (e.g., via hardware, software or both) to operate in a reduced tractive effort mode. For example, locomotives able to operate in reduced tractive effort mode could have either a hardware "strap" or a signal that indicates that it is equipped with selectable tractive effort capability. Similarly, a road number may be selected from a pre-defined list of road numbers indicating that the unit is equipped with selectable tractive effort. In one exemplary embodiment, an appropriate controller may monitor both the road number of the locomotive and/or the presence or absence of the hardware strap to determine whether or not the locomotive is equipped to operate in a reduced tractive effort mode. At distributed power link time, the operator will select either the full tractive effort or reduced tractive effort mode. If the reduced tractive effort mode is selected, the distributed power unit on-board the lead locomotive would instruct the remote DPC to operate in the reduced tractive effort mode. Assuming the remote distributed power units are configured for reduced tractive effort operations, the DPC controller 24 on-board the remote would then energize trainlines, such as trainlines 18 and 19 (two trainlines may be used for redundancy). In one exemplary embodiment, each locomotive in consist 16 would operate in reduced tractive effort when they detect that either or both of these trainlines have been energized. Remote units that are equipped with the ability to operate in reduced tractive effort may default to this mode of operation for safety reasons. Remote units would return to normal levels of tractive effort when they detect that both trainline 18 and trainline 19 are de-energized. For example, this could happen when the operator selects the full tractive effort mode of operation at link time and the remotes receive the command from the lead unit to operate in full tractive effort mode and both trainlines 18 and 19 are de-energized.

In one exemplary embodiment, the locomotive controller is configured to restrict the tractive effort, not necessarily the horse power delivered by the locomotive. This allows normal performance at higher train speeds. As suggested above, two train lines may be used in order to provide a redundant, safe connection. It will be appreciated by those skilled in that art, that many communication techniques including wireless communication techniques may be used to communicate the desired operational mode. Thus, even though the table below makes reference to exemplary hard-wired lines, it will be appreciated that the present invention is not limited to hard-wired implementations since such information may be readily transferred via wireless communication as suggested above.

| T/L18 | T/L19 | Action |
|---|---|---|
| 0 (Low) | 0 (Low) | Normal Tractive Effort (e.g., 180,000 pounds) |
| 1 (High) | 1 (High) | Tractive effort will be limited to lower value e.g., 110,000 pounds ± 1800 lbs. |
| 0 (Low) | 1 (High) | Fault will be logged & TE will be limited to [TL_TE_LIM] |
| 1 (High) | 0 (Low) | Fault will be logged & TE will be limited to [TL_TE_LIM] |

In operation, controlled tractive effort (CTE) is a feature that automatically reduces tractive effort of locomotives that may be used as pushers or pullers, or both, in distributed-power mode. It is contemplated that one or more locomotives configured with CTE capability may be placed at the rear of the train depending, for example, on tonnage and controlled by a lead locomotive equipped with the distributed-power equipment, such as Locotrol distributed-power equipment. It is further contemplated that if one or more pushers are used, each of them would be CTE-equipped and the controlling unit at the head end could be any DP-equipped unit. For example, assuming an AC4400CTE locomotive is used in a pusher application in distributed-power mode, its tractive effort may be automatically reduced from 145,000 pounds at 11 mph to 110,000 pounds at 11 mph. The tractive effort reduction would essentially make the ACT4400CTE locomotive equivalent to a Dash-9 locomotive in tractive effort, and thus advantageously make such AC locomotive practical for applications such as DP Push/Pull on freight trains that are used both in heavy hauling applications and in lighter hauling applications. Thus, in one key aspect of the present invention, users of fleets of locomotives may be able to mix and match the tractive effort of the locomotives to the actual needs of any given train without having to wait for an available locomotive model capable of delivering the required tractive effort. Thus, the user would be able to use locomotives such as the ACT4400 CTE in multiple applications, such as those applications traditionally reserved for those locomotives as well as for applications where a lesser rated locomotive (from the point of view of tractive effort capability) would be used without having to wait for availability of the lesser rated locomotive. Thus, aspects of the present invention allow the users of fleet of locomotives for efficiently increasing the versatility of operation of such fleets.

Figure 3:
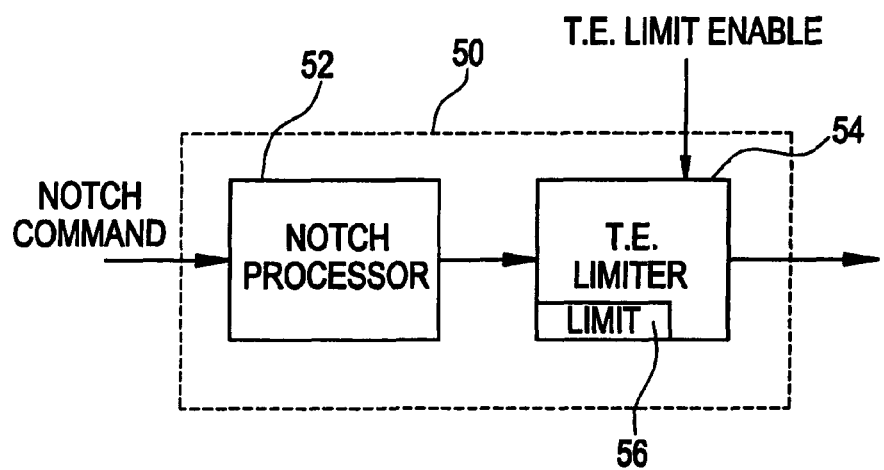
FIG. 3 is a block diagram of an exemplary tractive effort processor including a tractive effort limiter for selectively limiting the level of tractive effort produced by any given locomotive. In one exemplary embodiment, the value of the tractive effort limit is selected to avoid undesirable lifting conditions relative to the rail tracks where the train travels.

FIG. 3 is a basic block diagram used to facilitate understanding of operational aspects of the present invention. As shown in FIG. 3, a tractive effort processor 50 includes a notch processor 52 configured to generate a tractive effort consistent with a respective notch command supplied to the processor 52. A tractive effort limiter 54 is configured to limit the tractive effort using, for example, a tractive effort limit stored in a memory 56. In operation, upon activation of trainlines TL18 and TL19, the traction processor limits its total tractive effort reference in each motoring notch to the amount desired for limited tractive effort operation. The tractive effort reference may then be appropriately distributed (e.g., using standard optimization techniques) to each wheel axle based on the performance capability of each axle. Each axle and processor essentially comprises a closed loop mechanism that continuously processes feedback performance data, which is then used to re-allocate the distribution of tractive effort to each axle to best achieve the reference value of tractive effort. It will be appreciated that if axle capabilities are degraded due to conditions such as poor rail condition, thermal limitation or horsepower limitations, the reference may not be achieved even with optimal re-allocations of tractive effort to other axles. The operator may be informed of the limited tractive effort mode of operation by way of a summary message that may be displayed in a suitable display unit. The summary message may provide information indicative of whether or not tractive effort reduction is enabled, such as "TE Limited: TE Reduction Enabled".

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling a level of tractive effort in a train having a first locomotive constituting a command locomotive, operable through a range of engine power settings, and a second locomotive positioned in the train at a spaced location from the command locomotive, said second locomotive constituting a command-follower locomotive, operable through a range of engine power settings, with at least one railcar being positioned between the command and command-follower locomotives, a communication link between the command and command-follower locomotives for transmitting and receiving engine power control signals for controlling locomotive engine power settings and tractive effort control signals for controlling the level of tractive effort, and at least one of the locomotives being configured to selectively operate in either of two modes of operation comprising a first mode in which said at least one locomotive generates a different tractive effort than when said at least one locomotive is in a second mode of operation, the method comprising;

at the command locomotive selecting between the two modes of operation for producing a level of tractive effort appropriate for conditions as the train moves along a length of track;

transmitting a tractive effort control signal indicative of the selected mode of operation;

receiving the tractive effort control signal at another of said locomotives; and controlling the tractive effort generated at said at least one locomotive so as to develop a differential in the tractive effort generated by the command and command-follower locomotives, with the tractive effort generated at the command locomotive being different than that generated at the command-follower locomotive, in one of the two modes of operation, whereby with the command and command-follower locomotives under power to operate in engine power settings to move the train in a given direction of travel, the differential in the tractive effort generated by the command and command-follower locomotives is selected to avoid an occurrence of a derailment condition that otherwise can develop in a railcar between the command and command-follower locomotives.

\* \* \* \* \*